United States Patent Office 3,287,468
Patented Nov. 22, 1966

3,287,468
2-NITROIMIDAZOLES AND PROCESS
Alden Gamaliel Beaman, North Caldwell, and Robert Duschinsky, Essex Fells, N.J., and William Paul Tautz, New York, N.Y., assignors to Hoffmann-La Roche Inc., Nutley, N.J., a corporation of New Jersey
No Drawing. Filed Nov. 17, 1964, Ser. No. 411,714
10 Claims. (Cl. 260—309)

The present invention relates to nitroimidazoles and more particularly relates to 2-nitroimidazoles and to processes for their preparation.

In one of its aspects, the invention relates to processes for the preparation of 2-nitroimidazoles of the formula:

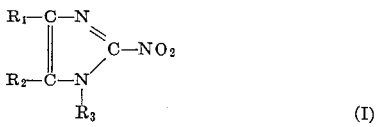

wherein $R_1$, $R_2$, and $R_3$ are hydrogen or lower alkyl.

The instant processes are carried out by reacting a 2-aminoimidazole of the formula:

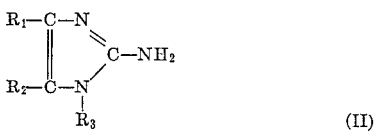

wherein $R_1$, $R_2$, and $R_3$ have the above meanings, or an acid addition salt thereof, e.g., a sulfate, nitrate, chloride, etc., with an alkali metal nitrite, e.g., sodium or potassium nitrite. The reaction medium is aqueous and must have a pH less than about 8. There is no lower limit on the pH; for example, the reaction can be carried out successfully in 16 normal $H_2SO_4$. The required pH of less than about 8 is obtained by the addition of a mineral acid, e.g., $H_2SO_4$, $HNO_3$, HCl, etc., or by employing a mineral acid addition salt of the compound of Formula II. However, high concentrations of HCl are preferably not employed, e.g., a different mineral acid is preferably employed when the pH is less than about 1. Reaction temperatures employed are in part dependent on the pH of the reaction mixture. For example, where the pH ranges from about 2 to about 8, a temperature ranging from about 40 to about 150° C., preferably about 50 to about 100° C. is employed. At temperatures below about 40°, within the above pH range, essentially no product is obtained, even on long standing, e.g., 16 hours or longer. Also, heating to a temperature above 40°, after the reaction mixture has stood for a long time below 40°, does not result in the production of any discernible product. At a pH below about 2, temperatures ranging from about −10° to about 30° C., preferably about 20°, are employed. Temperatures somewhat higher than 30°, e.g., up to about 50° C., can also be employed, except when the reaction medium is very highly acidic, e.g., 10–16 normal mineral acid.

While the 2-nitroimidazoles of Formula I can be prepared by the above processes, the yields are generally low, e.g., 1 to 15 percent. It has now also been found that when the above reactions are carried out in the presence of a water-soluble copper salt, i.e., either a cupric or cuprous salt, e.g., cupric sulfate, cuprous nitrate, etc., with cupric sulfate preferred, surprisingly higher yields of product are obtained, e.g., up to about 70 percent. Hence, the instant processes carried out in the presence of a copper salt are not to be considered equivalent to the instant processes carried out in the absence of a copper salt. Copper salts which contain an anion capable of replacing a diazonium group, e.g., the chloride ion, are preferably not employed in the processes of the invention.

The invention also relates to novel compounds of the formula:

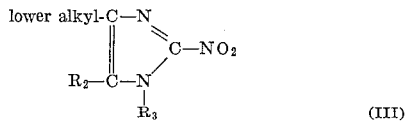

wherein $R_2$ and $R_3$ have the meanings given above, and, when $R_3$ is hydrogen, to salts thereof with pharmacologically acceptable strong bases, e.g., pharmaceutically acceptable strong inorganic bases, e.g., alkali and alkaline-earth metal hydroxides, etc., pharmaceutically acceptable strong organic bases, e.g., ethanolamine, primary-, secondary-, and tertiary-alkyl amines, etc.

The novel compounds of Formulas I and III and their salts are active against bacteria, pathogenic yeasts, and protozoa, and are useful as germicides, antiprotozoa agents, and as agents for the treatment of pathogenic protozoal infections, e.g., *Trichomonas vaginalis*, *Histomonas maleagridis*, etc. They can be administered orally, parenterally, or topically, e.g., in combination with the usual pharmaceutical adjuvants. Typical internal dosages range from about 20 to about 200 mg./kg. animal body weight, with dosage adjusted to species and individual requirements.

The term "lower alkyl" used in the specification is to be understood to mean a straight or branched chain $C_1$–$C_7$ alkyl group, e.g., methyl, ethyl, propyl, butyl, isobutyl, hexyl, etc., with methyl preferred.

The invention will be better understood by referring to the following examples which are given for illustration purposes only and are not meant to limit the invention.

EXAMPLE 1

*Preparation of 2-nitroimidazole*

15.7 grams (119 millimoles) of 2-aminoimidazole sulfate, 41 grams (595 millimoles) of sodium nitrite, and 297 grams (1190 millimoles) of cupric sulfate $$(CuSO_4 \cdot 5H_2O)$$

were dissolved in 18 liters of distilled water and the solution allowed to stand at room temperature for 16 hours. The pH of the resulting slurry was adjusted to 2.0 with dilute nitric acid whereupon a fine brown solid present completely dissolved. The water solution was extracted with ethyl acetate in an extraction column.

The ethyl acetate extract was evaporated in vacuo to a volume of about 250 ml., giving a dark yellow solid. The slurry was cooled in ice and the solid (5.11 grams) collected. The ethyl acetate filtrate from the first crop was evaporated to 50 ml. and cooled to give a second crop, weight 0.23 gram. The combined dark yellow solid (5.34 grams) was sublimed at 175° at 0.5 to 1.0 mm. Hg to give 5.03 grams of light yellow 2-nitroimidazole.

2-aminoimidazole, employed in the above process, can be prepared by either of the following processes:

(a) 50 grams of 2-p-bromobenzeneazoimidazole was hydrogenated in ethanol solution using Raney nickel catalyst. The filtrate from the catalyst was evaporated to a red-brown oil at water aspirator vacuum. 65 ml. of distilled water was added to the oil, whereupon p-bromoaniline precipitated. This was filtered and washed with 15 ml. of distilled water. The filtrate plus the water wash was extracted with 100 ml. of ether. To the aqueous layer 10 ml. of concentrated sulfuric acid was added. Then 400 ml. of absolute ethanol was added slowly with stirring and the solution was refrigerated overnight. Nearly colorless lath-shaped crystals formed. These were collected, washed with 25 ml. of absolute ethanol, and dried; weight 10.7 grams; melting point—darkens 255°, melts 278° dec. The crude 2-aminoimidazole sulfate is dissolved in three volumes of boiling distilled water, and eight volumes of boiling ethanol added, and the resulting solution refrigerated to give colorless laths of 2-aminoimidazole sulfate; melting point 280° dec. with a recovery of over 90 percent.

(b) 100 grams of aminoacetaldehyde diethyl acetal and 162 ml. of distilled water were mixed and then 90 grams of methylisourea sulfate was added. The solution was allowed to stand at room temperature for 48 hours. The water was evaporated at water aspirator vacuum and the resulting viscous oil treated with 1100 ml. of acetone, whereupon a white solid formed very slowly. The mixture was allowed to stand overnight, and the solid collected; weight 116 grams. This was dissolved in 200 ml. of boiling absolute methanol, 200 ml. of hot acetone added, and the mixture allowed to cool to 35°, and filtered. To the filtrate was added 1500 ml. of acetone to give a white solid, N-(2,2-diethoxyethyl)guanidine sulfate, yield 84 grams (51 percent); melting point 150–153°.

Distilled water (750 ml.) plus 4.8 ml. of concentrated sulfuric acid was heated to boiling and 76.6 grams of N-(2,2-diethoxyethyl)guanidine sulfate was added in small portions slowly to the stirred boiling 1 percent sulfuric acid solution. The addition required 15 minutes and the mixture was boiled for an additional 15 minutes. The solution was concentrated in vacuo to a volume of about 60–70 ml. and was diluted to 700 ml. with absolute ethanol. A white solid formed, weight 34.7 grams. This was dissolved in 100 ml. of boiling distilled water and 300 ml. of boiling ethanol was added with stirring, and the solution refrigerated to give 34.2 grams (76 percent) of colorless laths of 2-aminoimidazole sulfate; melting point 280° dec.

The starting materials of Formula II wherein R is lower alkyl are prepared by procedure (a) above. In particular, an imidazole having the desired alkyl substituent in the 4-position is coupled with a p-bromophenyl diazonium salt, e.g., the chloride or sulfate salt, to form an alkyl-imidazole p-bromobenzene azo compound; and the azo compound is reduced with hydrogen in the presence of Raney nickel to produce a corresponding alkyl 2-amino-imidazole of Formula II. Another process for their preparation is given by Hofmann, The Chemistry of Heterocyclic Compounds: Imidazole and Its Derivatives, Part I, page 141 (1953).

EXAMPLE 2

*Preparation of 2-nitroimidazole without a copper salt*

2-aminoimidazole hydrochloride (660 mg.) plus 1.60 grams of $NaNO_2$ were dissolved in 40 ml. of distilled water and the solution allowed to stand at room temperature for one hour. The solution was heated on the steam bath for 2 hours. U.V. analysis of the solution indicated a 6 percent yield of 2-nitroimidazole. The solution was cooled, filtered, acidified to pH 2, and extracted with ethyl acetate. Evaporation of the ethyl acetate gave a solid which was sublimed to yield 8 mg. (1 percent) of 2-nitroimidazole.

EXAMPLE 3

*Preparation of 2-nitro-4-methylimidazole*

A suspension of 8.58 grams (32.2 millimoles) of 2-(p-bromobenzene azo)-4-methylimidazole in 200 ml. of ethanol was hydrogenated in the presence of 2 grams of Raney nickel at 200 to 300 pounds pressure at 50° C. 2 moles of hydrogen were taken up in 4 hours. The filtrate from the catalyst was evaporated to give a reddish oil, which deposited crystalline p-bromoaniline upon addition of 10 ml. of water. The p-bromoaniline was removed by filtration and washed with 10 ml. of water. The combined filtrate and washing was extracted with 20 ml. of benzene, the aqueous layer was evaporated to about 10 ml. and neutralized (methyl orange) by addition of 2.7 ml. of 12 N $H_2SO_4$. Addition of 50 ml. of ethanol and 25 ml. of ether produced crystals, which were filtered off after standing for 2 hours at −5°. The crystals were washed with ethanol and ether to yield 2.85 grams (61 percent) of 2-amino-4-methylimidazole sulfate melting at 224–229°. The crude product is used for the next step.

Recrystallization of 1.45 grams of crude product from a mixture of 1 ml. of water and 10 ml. ethanol yielded 1.22 grams of analytically pure 2-amino-4-methylimidazole sulfate, melting point 229–231°.

To a solution containing 2.5 grams of cupric sulfate pentahydrate (10 millimoles) and 0.35 gram of sodium nitrite (5 millimoles) in 360 ml. of water there was added 0.146 gram of 2-amino-4-methylimidazole sulfate (0.5 millimole = 1 milliequivalent) dissolved in 1 ml. of water. The mixture was allowed to stand 21 hours at room temperature.

The solution was then rendered more acid by the addition of 1.5 ml. of diluted hydrochloric acid (1 volume conc. HCl + 1 volume $H_2O$). The pH of the mixture dropped from 5.25 to 2.0.

The resulting clear solution was extracted twice with 300 ml. of ethyl acetate. By evaporation of the ethyl acetate and crystallization of the obtained mixture from ca. 1.5 ml. of water, needles of 2-nitro-4-methylimidazole were obtained.

EXAMPLE 4

*Preparation of 2-nitroimidazole*

A mixture of 400 ml. of 12 N $H_2SO_4$, 12.7 grams of hydrated cupric sulfate and 6.7 grams of 2-aminoimidazole sulfate was cooled to −20° and with stirring a solution of 69 grams of sodium nitrite in 80 ml. of water was added slowly below the surface of the reaction mixture. The resulting mixture was removed from the cooling bath and allowed to stand at room temperature for 24 hours. The pH was adjusted to 0.5 by addition of concentrated aqueous ammonia in the cold. Part of the desired product precipitated and the remainder was extracted with ethyl acetate. The yield of pure 2-nitroimidazole was 2.0 grams (35 percent).

EXAMPLE 5

*Preparation of 2-nitroimidazole*

To a solution of 13.2 grams of 2-aminoimidazole sulfate in 200 ml. of 12 N $H_2SO_4$, a solution of 34.5 grams of $NaNO_2$ in 40 ml. of water was added slowly with stirring below the surface of the solution at −20°. The reaction mixture was removed from the cooling bath and allowed to stand at room temperature for 24 hours. The yield of 2-nitroimidazole was 15 percent on the basis of U.V. absorption.

EXAMPLE 6

*Preparation of 1-methyl-2-nitroimidazole*

A solution of 6.7 grams of 1-methyl-2-aminoimidazole hydrochloride (0.05 mole) and 12.5 grams of cupric sulfate pentahydrate (0.05 mole) in 800 ml. of 12 N $H_2SO_4$ was cooled to −15°. A solution of 69 grams of sodium nitrite (1 mole) in 160 ml. of water was introduced slowly through a dropping funnel dipping into the liquid near the bottom of the reaction vessel, while the temperature was kept near −20°. The resulting deep blue solution was warmed up slowly to room temperature and was allowed to stand for 40 hours. Addition of 450 ml. of concentrated aqueous ammonia under efficient cooling brought the pH to 0.5. The solution was extracted twice with 1 liter of ethyl acetate. According to spectro photometric analysis, the extract contained about 0.02 mole 1-methyl-2-nitroimidazole (40 percent of the theory). Evaporation of the ethyl acetate solution gave crude 1-methyl-2-nitroimidazole which was recrystallized from 25 ml. of isopropanol to yield 1.62 grams (25.4 percent), melting point 102–103° and found to be identical by mixed melting point and thin layer chromatography with the product obtained according to G. G. Gallo, C. R. Pasqualucci, P. Radaelli, and G. C. Lancini, J. Org. Chem. 29, 862 (1964).

EXAMPLE 7

*Preparation of 4,5-dimethyl-2-nitroimidazole*

4,5-dimethylimidazole sulfate (32 mg.) plus 0.2 millimole of hydrated cupric sulfate were dissolved in 17 ml. of 11.8 N $H_2SO_4$ and the solution cooled to 0°. A solution of 307 mg. of $NaNO_2$ in 3 ml. of water was added slowly below the surface of the formed solution. The mixture was allowed to stand at room temperature overnight, the pH adjusted to 1 with concentrated aqueous ammonia and the resulting solution extracted with 3 portions of ethyl acetate. The combined ethyl acetate extracts were dried, evaporated in vacuo to give a yellow solid which was sublimed at 100–110° and 0.5 mm. to give 19 mg. (68 percent) of 4,5-dimethyl-2-nitroimidazole.

We claim:

1. A process for the preparation of a compound of the formula:

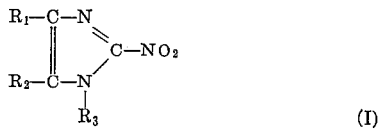

(I)

wherein $R_1$, $R_2$, and $R_3$ are each selected from the group consisting of hydrogen and lower alkyl, comprising reacting a compound selected from the group consisting of a compound of the formula:

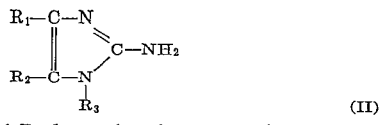

(II)

wherein $R_1$, $R_2$, and $R_3$ have the above meaning, and an acid addition salt thereof, with an alkali metal nitrite in an aqueous reaction medium having a pH less than about 8 at a temperature above about 40° C. when the pH is between about 2 and about 8, and below about 50° C. when the pH is less than about 2 to form a compound of Formula I above.

2. A process according to claim 1 wherein $R_1$, $R_2$, and $R_3$ are hydrogen.

3. A process according to claim 1 wherein $R_1$ is methyl and $R_2$ and $R_3$ are hydrogen.

4. A process according to claim 1 wherein the pH is in the range of about 2 to about 8, and the reaction temperature is in the range of about 40° to about 150° C.

5. A process according to claim 4 wherein the reaction temperature is in the range of about 50° to about 100° C.

6. A process for the preparation of a compound of the formula:

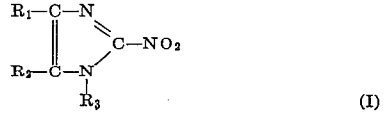

(I)

wherein $R_1$, $R_2$, and $R_3$ are each selected from the group consisting of hydrogen and lower alkyl, comprising reacting a compound selected from the group consisting of a compound of the formula:

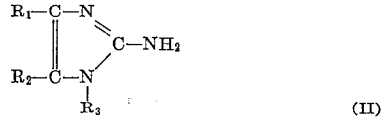

(II)

wherein $R_1$ to $R_3$ have the above meaning, and an acid addition salt thereof, with an alkali metal nitrite in the presence of a water soluble copper salt having an anion selected from the group consisting of sulfate and nitrate in an aqueous reaction medium having a pH less than about 8 to form a compound of Formula I above.

7. A process according to claim 6 wherein said copper salt is cupric sulfate.

8. A compound selected from the group consisting of (a) a compound of the formula:

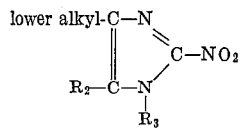

wherein $R_2$ and $R_3$ are each selected from the group consisting of hydrogen and lower alkyl, and (b) when $R_3$ is hydrogen, a salt of (a) with a strong pharmaceutically acceptable base.

9. 2-nitro-4-methylimidazole.

10. 4,5-dimethyl-2-nitroimidazole.

References Cited by the Examiner

UNITED STATES PATENTS 3,065,133   11/1962   Tchelitcheff _____ 260—309

FOREIGN PATENTS 837,838   6/1960   Great Britain.

OTHER REFERENCES

Allsebrooke et al.: Jour. Chem. Soc. (London), 1942, pages 234–35.

Gallo et al.: Jour. Org. Chem., vol. 29, pages 862–65 (April 1964).

Hodgson et al.: Jour. Soc Dyers and Colourists, vol. 66, pages 229 to 231 (1950).

Hodgson et al.: Jour. Chem. Soc. (London), 1948, pages 1512–13.

Hodgson et al.: Jour. Chem. Soc. (London), 1949, pages 1624–1625.

Nakamura: Chemical Abstracts, vol. 50, columns 15897 to 15898 (1956).

Pyman et al.: Jour. Soc. Dyers and Colourists, volume 38, pages 269 to 272 (1922).

Wagner et al.: Synthetic Organic Chemistry, pages 749 and 772–73, New York, Wiley, 1953.

WALTER A. MODANCE, *Primary Examiner.*

NATALIE TROUSOF, *Assistant Examiner.*